June 5, 1962   L. W. KIRKPATRICK ET AL   3,037,494
SELF ADJUSTING VALVE GUIDE
Filed Aug. 17, 1960
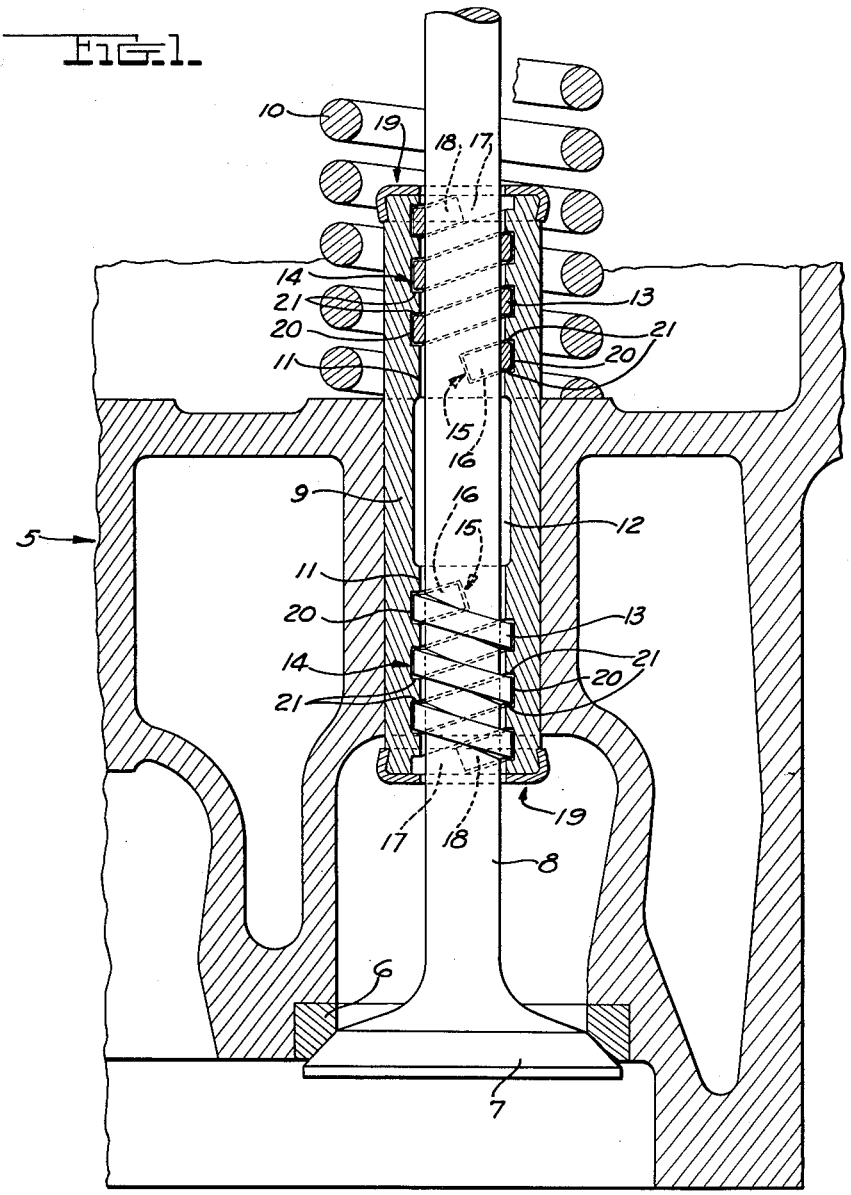
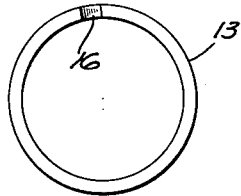
INVENTORS
*Emil Reusch and
Leland W. Kirkpatrick*
BY *Roy A. Plant*
ATTORNEY United States Patent Office 3,037,494
Patented June 5, 1962

3,037,494
SELF ADJUSTING VALVE GUIDE
Leland W. Kirkpatrick, Battle Creek, Mich., and Emil Reusch, Fort Wayne, Ind., assignors to Rich Manufacturing Corporation, Battle Creek, Mich., a corporation of Michigan
Filed Aug. 17, 1960, Ser. No. 50,170
16 Claims. (Cl. 123—188)

This invention relates broadly to poppet valve assemblies, and in its specific phases to a new and improved guiding means for the stems of poppet valves, particularly those used in internal combustion motors.

The basic problem in maintaining safe operating valve temperatures is fundamentally connected with the type of seat the valve contacts. Generally speaking, it is a very difficult design and manufacturing problem to maintain consistently true and uniform valve seats under variable operating conditions, and what makes it most important is the fact that the non-uniformity of the cylinder head or cylinder block seat for the valve is basically the major item affecting the valve temperature. These temperatures increase very rapidly with leakage due to the untrue seating of the valve.

As a matter of fact, no seat in the cylinder block or head holds its shape perfectly under operating conditions. This shape varies from one being truly eccentric to the center line of the guide, to various types of ovals. Also, the distortion is not a constant. It varies in operation with changes in speed, load, fuel-air ratio, cooling, and, in fact, anything that can influence the shape.

When the valve is closing and impacting the seat, or when gas loading is applied, the head of the valve tends to tip under valve spring pressure to conform to the mating seat, imposing a bending stress in the valve neck. A slight tipping of the head of the valve, however, results in sealing. If the distortion is so great that the flexing in the stem will not permit sealing, then leakage under the valve head causes excessive temperatures in the valve head and seat and high stresses are encountered and local corrosion occurs, resulting in a loss of metal in the throat area sufficient to eventually cause breakage at normal seating velocities.

To combat a condition of too great a rigidity of the valve, a certain flexibility usually has been designed into the head shape by making the stem portion close to the neck relatively weaker. Fortunately, the high modulus of elasticity of most valve materials in combination with dimensional changes in the neck and stem portion of the valve has brought about the desired seating results without difficulties, but it has been found that there is a limit to this method of making the valve head elastically deflect in order to seal an eccentric hole. First, we must realize that the deflection of the head is the result of the application of a force, and since any external force produces stress which is the internal resistance to the load in balancing the force, it is easy to understand that a design where we build in a certain flexibility to secure the proper seating, will subject the valve continuously to intermittent and localized stressing. In the second place, a great many valves are at present made from less ductile materials such, for instance, as used in cast valves which material, due to the lower modulus of elasticity, would require much greater dimensional changes in the valve neck and stem portions to produce the same flexibility of the head, and, no doubt, we may, in doing this, weaken the valve to such an extent as to lead to more common breakage in operation.

There is another angle to be considered. In a case where the seat is not perfectly installed in the cylinder head; that is, where the seat is not exactly at a right angle to the longitudinal axis of the valve, or the seat is eccentric in relation to the valve contour, and flexibility in the neck portion is lacking, the valve will not seat itself unless excessive clearance is provided in the valve stem guide. Excess clearance, however, combined with the action of the valve spring, produces a highly undesirable side thrust due to the slanted position of the stem in the guide, and at high engine speeds may even develop vibrational stresses in the stem close to the head, resulting in a brittle fracture.

The valve stem guide clearance plays also an important role in the cooling of the valve. The clearance must be large enough to permit a free sliding fit between the two parts at operating temperatures, and yet be as small as possible to permit efficient heat transfer from the valve stem to the guide. An adequate clearance would be .001 inch. This would allow a valve to drop of its own weight in the hole of a guide having, for instance, the conventional .375 inch size. In practice, however, this close fit cannot be obtained. It is impossible, with any reamer one can buy, to ream the guides with any assurance of two holes giving the same stem clearance. Further, a large stem on one valve in a small guide hole will give only low clearance, while the next valve may have a small stem and the guide hole may be large to give the opposite condition. A difference of .002 to .004 inch in the actual clearance between the valve stem and guide hole is likely to be found on any job, and this cannot be overcome with the currently in use design and assembly methods, which makes it necessary to have sufficient (really excessive and undesirable) clearance to take care of the inaccuracies.

Accordingly among the objects of the present invention is the overcoming of the above difficulties by providing new and improved valve guiding means including a helical coiled spring through which the valve stem slidably extends, the spring being mounted for slight floating movement to permit the valve to more readily take any required position for true engagement of the valve head with its seat.

Another object is to provide for effective heat transfer and valve cooling while avoiding valve guide expansion and contraction problems.

Another object is to provide a novel construction in which effective lubrication may be attained to minimize wear and scuffing of the valve stem and guide.

A further object is to provide a novel construction in which slight alternate compression and extension of the valve guide spring during motor operation will tend to continuously rotate the valve for better seating.

A still further object is to provide a strong and durable construction which may be easily and inexpensively embodied in an otherwise conventional motor.

Still further objects and advantages of the invention will appear as the description proceeds.

To the accomplishment of the foregoing and related ends, the invention, then, consists of the valve means hereinafter fully described and particularly pointed out in the claims, the annexed drawing and the following description setting forth in detail certain means for carrying out the invention, such means illustrating however, but one of various ways in which the principle of the invention may be used.

In the annexed drawing:

FIGURE 1 is a sectional view showing portions of a valve-in-head motor embodying the use of two valve-guiding springs.

FIGURE 2 is an enlarged end view of one of the valve-guiding springs.

The construction shown in the drawing will be rather specifically described, but it is to be understood that variations may well be made within the spirit and scope of the invention as herein shown and described. For example, while two stem-guiding springs have been shown, it is feasible to employ only one at one end of the valve guiding body, which otherwise would be of conventional form, and the showing is to be considered as diagrammatically illustrating same.

A conventional cylinder head 5 carries an inserted valve seat 6 with which the valve head 7 cooperates. The valve stem 8 is surrounded by a fixed guide body 9, is moved in valve-closing direction by the customary valve spring 10, and is moved in valve-opening direction by conventional means, not shown. The stem 8 has suitable clearance 11 with the guide body 9, and, if desired, this body may be internally recessed at 12 for clearance and lubricant reception.

In each end portion of the guide body 9, a helical, coiled, externally and internally cylindrical valve-guiding spring 13 is mounted. Each spring surrounds the stem 8 with a somewhat snug though slidable fit and with only trivial or substantially no clearance. Each valve-guiding spring 13 is so mounted that it can float laterally to a slight extent and can also float longitudinally to a slight extent. Each floating valve-guiding spring 13 can thus shift sufficiently to allow the valve head 7 to accurately engage the seat 6 whether the latter be slightly mis-aligned axially with the guide body 9, being somewhat eccentric to said body, or slightly abnormally angled with respect to said body, and even if the stem 8 should be slightly curvedly warped. Also, during the opening and closing movements of the valve, each spring 13 will have a limited longitudinal pumping action which is of advantage for stem lubrication. Moreover, the longitudinal movements of each spring 13 may result in some alternate elongation and contraction of the spring. This may cause the spring to twist somewhat and therefore alternately lightly grip and release the stem 8, thereby turning the valve step-by-step to attain the best possible seating thereof by preventing any given restricted circumferential area of the valve head 7 from always contacting with only one such area of the seat 6.

The springs 13 may be constructed from heat-treated stainless steel or other suitable wear and heat resisting metal, and as the direct contact valve guiding is performed by these springs and none by the guide body 9, this body need not be hardened and may be formed from the same metal or a metal of similar characteristics to that used in constructing the cylinder head 5, or other member in which said body 9 is mounted. Better heat transfer from the press fit body 9 to the cylinder head or the like will thus be attained for better valve cooling. Also, as the body 9 will have substantially the same coefficient of expansion as the cylinder head or the like, prior difficulties arising from the use of metal having different coefficients of expansion are avoided.

Each end portion of the guide body 9 has an internal helical groove 14 formed therein; and the spring 13 is "threaded" into this groove with small clearances to allow the desired longitudinal and lateral floating of the spring. The inner end of the groove 14 is blind and is in close abutting relation, at 15, with the inner extremity 16 of the spring 13. The outer end 17 of the groove 14 opens through the end of the guide body 9 and receives the outer end 18 of the spring 13.

Snap-on caps 19 are preferably provided on the ends of the guide body and are disposed in closely abutting relation with the outer ends 18 of the springs 13 to prevent said springs from creeping out of the grooves 14 while permitting slight endwise freedom of movement of said springs under operating conditions.

A suitable very small radial clearance 20 is provided between each spring 13 and the bottom of its receiving groove 14 to permit, as set forth above, the shifting of the valve head 7 sidewise sufficiently to overcome the normal out of line inaccuracies in valve seating. In addition there is a suitable longitudinal clearance 21 between each spring 13 and the sides of its receiving groove 14, as shown, so as to allow the valve-guiding springs to also float endwise to a limited extent as an aid to seating the valve and also to vary the friction on the valve stem 8 in its endwise movements and thus promote a valve rotating tendency.

From the foregoing, it will be seen that a novel construction has been disclosed for attaining the desired ends, but attention is again invited to the possibility of making variations within the spirit and scope of the invention as illustrated and described.

Other modes of applying the principle of our invention may be employed instead of the one explained, change being made as regards the valve-guiding apparatus herein disclosed, provided the means stated by any of the following claims or the equivalent of such stated means be employed.

We therefore particularly point out and distinctly claim as our invention:

1. In an assemblage having a poppet valve with head and stem and in which the head of said poppet valve is cooperable with a valve seat, the combination therewith of a guiding means for the valve stem, said guiding means including at least one helical coiled valve-guiding spring in contact with and through which said stem slidably extends.

2. A structure as specified in claim 1, in which said spring is mounted for restricted lateral movement with said stem.

3. A structure as specified in claim 1, in which said spring is mounted for restricted longitudinal movement with said stem.

4. A structure as specified in claim 1, in which said spring is mounted for restricted lateral and longitudinal movements with said stem.

5. A structure as specified in claim 1, in which said spring is mounted for restricted lateral movement with said stem, at least the stem-engaging inner side of said spring being cylindrical.

6. A structure as specified in claim 1, in which said spring is mounted for restricted longitudinal movement with said stem, at least the stem-engaging inner side of said spring being cylindrical.

7. A structure as specified in claim 1, in which said spring is mounted for restricted lateral and longitudinal movements with said stem, at least the stem-engaging inner side of said spring being cylindrical.

8. In an assemblage including a poppet valve with head and stem and in which the head of said poppet valve is cooperable with a valve seat, the combination therewith of a guiding means for the valve stem, said guiding means including at least one helical coiled valve-guiding spring closely fitting and normally contacting said stem which slidably extends through same, at least the stem-engaging inner side of said spring being cylindrical.

9. In a poppet valve including assemblage in which the head of a poppet valve is cooperable with a valve seat, wherein there is a guiding means for the stem portion of said poppet valve, said guiding means including at least one helical coiled spring through which said stem extends slidably and closely fits, and a fixed member surrounding said spring and stem, said fixed member having a helical internal groove in which the convolutions of said spring are confined.

10. A structure as specified in claim 9, in which said spring convolutions have restricted clearance with the walls of said groove to permit limited lateral floating of the spring.

11. A structure as specified in claim 9, in which said spring convolutions have restricted clearance with the walls of said groove to permit limited longitudinal floating of the spring.

12. A structure as specified in claim 9, in which said spring convolutions have restricted clearance with the walls of said groove to permit limited lateral and longitudinal floating of the spring.

13. A structure as specified in claim 9, in which said spring convolutions have restricted clearance with the walls of said groove to permit limited lateral floating of the spring, both the inner and outer sides of said spring being cylindrical.

14. A structure as specified in claim 9, in which said spring convolutions have restricted clearance with the walls of said groove to permit limited longitudinal floating of the spring, both the inner and outer sides of said spring being cylindrical.

15. In an assemblage in which the head of a poppet valve is cooperable with a seat, guiding means for the valve stem including at least one helical coiled spring through which said stem extends slidably and closely fits, and a fixed member surrounding said spring and stem, said fixed member having a helical internal groove in which the convolutions of said spring are confined, in which the inner end of said helical spring receiving groove is blind and is disposed in abutting relation with the inner extremity of said spring, and in which the outer end of said helical groove opens through an end of said fixed member, and an abutment secured to said end of said fixed member and disposed in abutting relation with the outer extremity of said spring.

16. In an assemblage which includes a poppet valve having a head and stem and in which the head of said poppet valve is cooperable with a valve seat, wherein there is guiding means for said valve stem, said guiding means including at least one helical coiled spring which is slightly movable with said valve stem which slidably extends through and closely fits same, and a fixed member surrounding said spring and stem, said fixed member having a helical internal groove in which the convolutions of said spring are confined, but slightly shiftable, both the inner and outer sides of said spring being cylindrical.

References Cited in the file of this patent

UNITED STATES PATENTS

| | | |
|---|---|---|
| 1,312,730 | Horn | Aug. 12, 1919 |
| 1,594,517 | Duffy | Aug. 3, 1926 |
| 2,807,253 | Etchells | Sept. 24, 1957 |

FOREIGN PATENTS

| | | |
|---|---|---|
| 196,653 | Great Britain | Apr. 23, 1923 |